(12) United States Patent
Allison et al.

(10) Patent No.: US 12,345,065 B2
(45) Date of Patent: Jul. 1, 2025

(54) MOBILE STAGE SYSTEM AND METHOD OF USE

(71) Applicant: Astra Stages, LLC, Pittsburg, KS (US)

(72) Inventors: Todd N. Allison, Pittsburg, KS (US); Gregory P Hertrich, Pittsburg, KS (US); James E Pingree, Pittsburg, KS (US)

(73) Assignee: Astra Stages, LLC, Pittsburg, KS (US)

( * ) Notice: Subject to any disclaimer, the term of this patent is extended or adjusted under 35 U.S.C. 154(b) by 171 days.

(21) Appl. No.: 18/106,552

(22) Filed: Feb. 7, 2023

(65) Prior Publication Data

US 2023/0250657 A1    Aug. 10, 2023

Related U.S. Application Data

(60) Provisional application No. 63/307,479, filed on Feb. 7, 2022.

(51) Int. Cl.
*E04H 3/28* (2006.01)
*B60P 3/025* (2006.01)
*E04B 1/343* (2006.01)

(52) U.S. Cl.
CPC .............. *E04H 3/28* (2013.01); *B60P 3/0252* (2013.01); *E04B 1/343* (2013.01)

(58) Field of Classification Search
CPC . E04B 1/343; E04B 1/344; E04H 3/28; E04H 3/24; B60P 3/0252
USPC .............................................................. 52/7
See application file for complete search history.

(56) References Cited

U.S. PATENT DOCUMENTS

| | | | |
|---|---|---|---|
| 2,052,757 | A | 9/1936 | Fitch |
| 2,143,235 | A | 1/1939 | Bassett |
| 2,857,993 | A | 10/1958 | Terrell |
| 3,002,557 | A | 10/1961 | Roth et al. |
| 3,044,540 | A | 7/1962 | Hammersley |
| 3,181,203 | A | 5/1965 | Wenger |
| 3,258,884 | A | 7/1966 | Wenger |
| 3,417,518 | A | 12/1968 | Christopher |
| 3,433,500 | A | 3/1969 | Christensen |
| 3,527,470 | A | 9/1970 | Ord |
| 3,547,459 | A | 12/1970 | Lapham |
| 3,620,564 | A | 11/1971 | Wenger et al. |
| 3,623,707 | A * | 11/1971 | Klopp .................. B66F 7/0608 187/269 |
| 3,633,324 | A | 1/1972 | Cuylits |
| 3,908,787 | A | 9/1975 | Wenger et al. |

(Continued)

OTHER PUBLICATIONS

"International Search Report and Written Opinion; PCT/US2023/012463".

*Primary Examiner* — Paola Agudelo
(74) *Attorney, Agent, or Firm* — Law Office of Mark Brown, LLC; Christopher M DeBacker

(57) ABSTRACT

A mobile entertainment stage which when deployed has a stage floor size of approximately twenty feet by sixteen feet, a gross trailer weight of seven-thousand pounds, an overall trailered height of six feet, eight inches, and a standard bumper hitch coupler allowing for a broader range of vehicles for towing. The stage front can be on either side of the stage. The trailered length of the invention is twenty-six feet but includes a break away or fold away hitch to decrease the overall length to approximately twenty-three feet. The length, width and height of the invention allows it to be stored in many garages

1 Claim, 22 Drawing Sheets

(56) References Cited

U.S. PATENT DOCUMENTS

| | | | |
|---|---|---|---|
| 3,984,949 A | 10/1976 | Wahlquist | |
| 3,985,254 A | 10/1976 | Grandury | |
| 4,026,076 A | 5/1977 | Analetto | |
| 4,232,488 A | 11/1980 | Hanley | |
| 4,464,868 A | 8/1984 | Howroyd | |
| 4,535,933 A | 8/1985 | Kuiper | |
| 4,720,945 A | 1/1988 | Berranger et al. | |
| 4,869,030 A | 9/1989 | Clark | |
| 4,883,306 A | 11/1989 | Stucky | |
| 1,917,217 A | 4/1990 | Rogers et al. | |
| 4,934,113 A | 6/1990 | Hall | |
| 4,949,649 A | 8/1990 | Terres et al. | |
| 5,078,442 A | 1/1992 | Rau et al. | |
| 5,094,285 A | 3/1992 | Murray | |
| 5,115,608 A | 5/1992 | Abraham et al. | |
| 5,145,029 A * | 9/1992 | Blasdell, Jr | E04G 1/22 182/69.5 |
| 5,152,109 A * | 10/1992 | Boers | E04H 3/24 296/26.02 |
| RE34,468 E | 12/1993 | Rau et al. | |
| 5,280,985 A * | 1/1994 | Morris | H04N 5/28 348/E5.061 |
| 5,327,698 A * | 7/1994 | Uhl | B60P 3/0252 52/68 |
| 5,375,899 A | 12/1994 | Wright | |
| 5,398,463 A | 3/1995 | Wright | |
| 5,400,551 A | 3/1995 | Uhl | |
| 5,417,468 A | 5/1995 | Baumgartner et al. | |
| 5,454,441 A | 10/1995 | Jines | |
| 5,476,050 A * | 12/1995 | Zimmer | B66F 11/042 254/122 |
| 5,524,691 A | 6/1996 | Jines | |
| 5,546,709 A | 8/1996 | Decker et al. | |
| 5,622,011 A | 4/1997 | Jines | |
| 5,651,405 A | 7/1997 | Boeddeker et al. | |
| 5,706,616 A | 1/1998 | Fernandez | |
| 5,716,090 A * | 2/1998 | Chang | B60P 3/0252 52/66 |
| 5,761,854 A | 6/1998 | Johnson et al. | |
| 5,875,591 A | 3/1999 | Jines | |
| 5,924,465 A | 7/1999 | Malott | |
| 5,947,502 A | 9/1999 | Kammerzell et al. | |
| 6,058,671 A | 5/2000 | Strickland | |
| 6,085,861 A | 7/2000 | Jines | |
| 6,176,495 B1 * | 1/2001 | Decker | B60S 9/12 280/6.153 |
| 6,393,769 B1 * | 5/2002 | Mertik | E04H 3/28 296/26.14 |
| 6,407,798 B2 | 6/2002 | Graves et al. | |
| 6,434,895 B1 | 8/2002 | Hosterman et al. | |
| 6,499,258 B1 | 12/2002 | Borglum | |
| 6,997,495 B1 | 2/2006 | Groezinger | |
| 7,213,869 B1 | 5/2007 | McClellan | |
| 7,500,285 B2 | 3/2009 | Willis | |
| 7,506,405 B2 | 3/2009 | Willis | |
| 8,978,311 B1 * | 3/2015 | Uhl | E04H 3/26 52/79.5 |
| 2002/0062605 A1 | 5/2002 | Matthews | |
| 2004/0108750 A1 | 6/2004 | Park | |
| 2008/0236055 A1 | 10/2008 | Laprise | |
| 2009/0126281 A1 | 5/2009 | Santini | |
| 2010/0024314 A1 | 2/2010 | Pope | |
| 2011/0031237 A1 | 2/2011 | Bilchinsky et al. | |
| 2012/0096775 A1 * | 4/2012 | Allison | E04H 3/24 52/79.5 |
| 2012/0272585 A1 | 11/2012 | Bilsen et al. | |
| 2012/0277010 A1 | 11/2012 | Bilsen et al. | |
| 2013/0067829 A1 * | 3/2013 | Johnstone | E04H 3/26 52/143 |
| 2014/0069025 A1 | 3/2014 | Maxam | |
| 2015/0107164 A1 | 4/2015 | Jung | |
| 2016/0009213 A1 | 1/2016 | Doucet et al. | |
| 2016/0090234 A1 * | 3/2016 | Ronstadt | B62D 33/08 220/6 |
| 2020/0290852 A1 * | 9/2020 | Rosencrance | B66F 7/0633 |
| 2021/0009024 A1 | 1/2021 | Wilson, Sr. | |
| 2021/0254351 A1 * | 8/2021 | Tubbs | E04G 5/14 |

\* cited by examiner

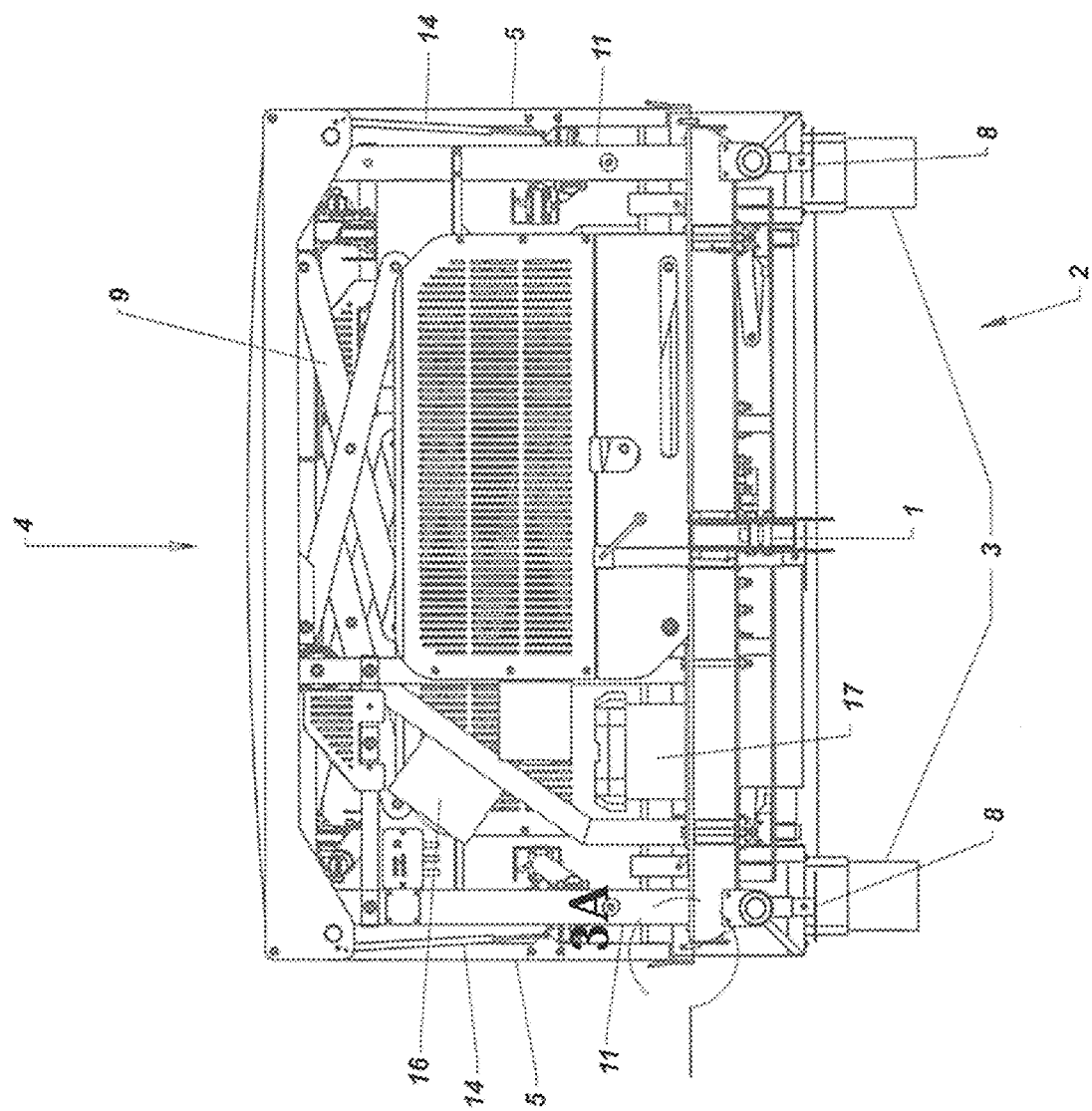

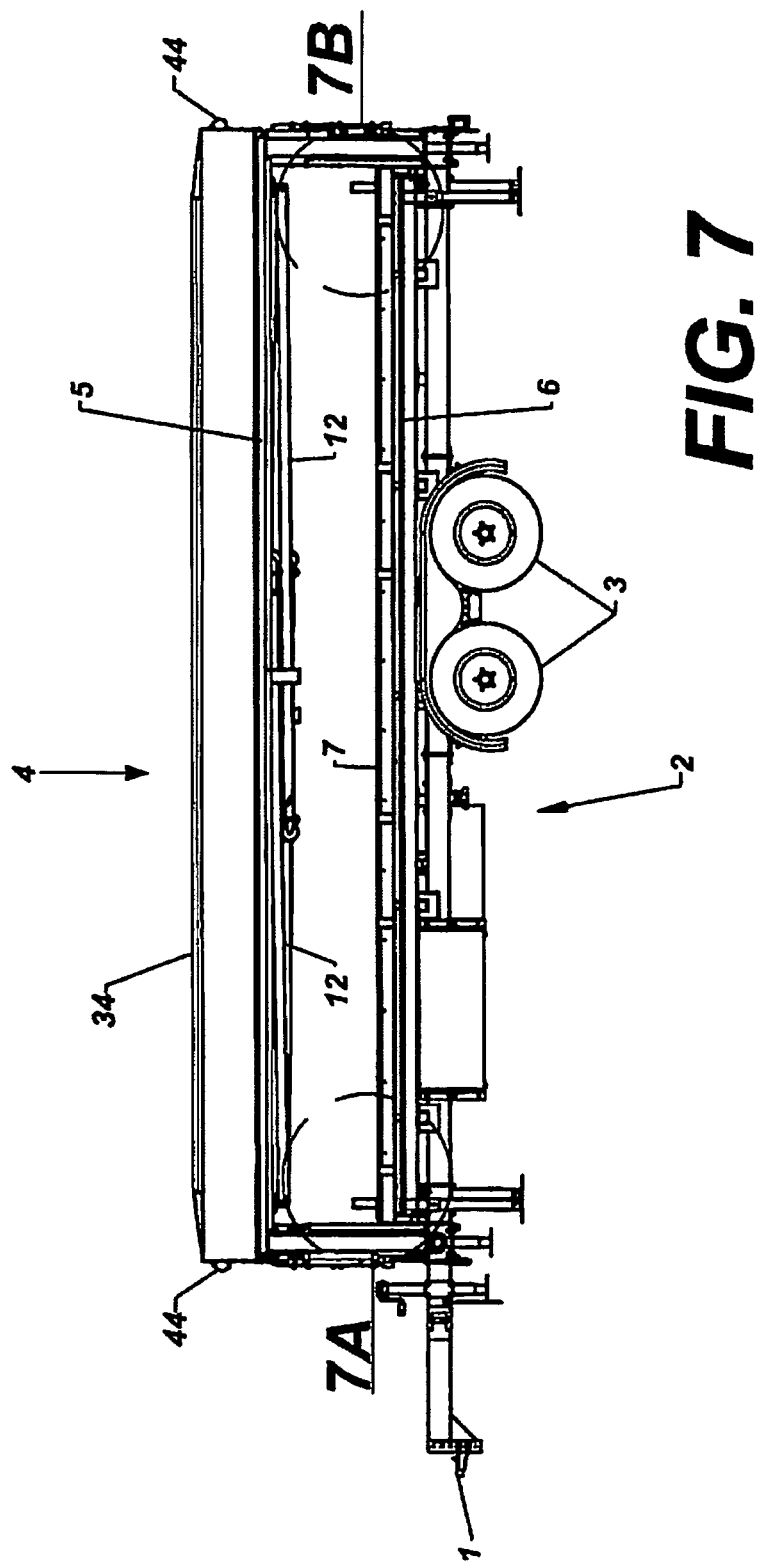

MOBILE STAGE SYSTEM AND METHOD OF USE

CROSS-REFERENCE TO RELATED APPLICATION

This application claims priority in U.S. Provisional Patent Application No. 63/307,479 Filed Feb. 7, 2022, which is incorporated herein by reference.

BACKGROUND OF THE INVENTION

1. Field of the Invention

The present invention relates generally to stages, and in particular to a mobile or portable stage for entertainment, instructional, educational and other presentations.

2. Description of the Related Art

Existing mobile entertainment stages are transported by attachment to the appropriate vehicle for transport. Some may be transported by a bumper hitch, but many require a gooseneck type hitch. This limits the transport vehicle to a pickup truck or semi with adequate capacity to carry the total load of the mobile stage. Most of the mobile entertainment stages are around ten feet or greater in overall height, so they cannot be stored in a typical residential garage. Many of the mobile entertainment stages also implement hydraulic cylinders for erection of the stage floors and roof structure which can be costly when including the cost and additional weight of all the necessary hydraulic fittings, hose, reservoirs, motors and pumps. These electric motors or gas engines require the additional requirements of transporting gasoline, or electric hookup or possibly an electric generator depending on the deployment location. What is needed is a compact, easy to transport mobile stage option that removes these limitations.

Heretofore there has not been available a mobile stage with the advantages and features of the present invention.

BRIEF SUMMARY OF THE INVENTION\

A preferred embodiment of the present invention is a mobile entertainment stage which when deployed has a stage floor size of approximately twenty feet by sixteen feet, a gross trailer weight of seven-thousand pounds, an overall trailered height of six feet, eight inches, and a standard bumper hitch coupler allowing for a broader range of vehicles for towing. The stage front can be on either side of the stage. The trailered length of the invention is twenty-six feet but includes a break away or fold away hitch to decrease the overall length to approximately twenty-three feet. The length, width and height of the invention allows it to be stored in many garages.

The preferred embodiment has an overall trailered width of one-hundred and two inches, so two four-foot-wide floor extensions are stored on top of the main stage floor which is eight feet wide. The two floor extensions have rollers underneath to prevent damage to the main stage floor and for easily moving them outward to the deployed position creating the sixteen-foot stage floor width. One stage floor extension weighs approximately four-hundred pounds in the invention leading to implementing a special tool to raise or lower the stage floor extension.

The preferred embodiment has a pair of telescoping square tubings on both sides which serves to lock the trailer sides in the stage trailered position and can move outward on either side unlocking the trailer sides and become supports for the previously mentioned floor extension.

The side walls of the preferred embodiment when in the first, trail orientation become part of the roof structure when transformed into the second, deployed stage orientation. Since the side walls rotate outward to become part of the roof structure and weigh a considerable amount, gas springs are implemented on both sides to help reduce the amount of force required. When deployed, the roof structure is lifted or lowered by implementation of a scissor type mechanism by use of winches which are powered by twelve-volt direct current deep cycle batteries. The scissor type mechanism was implemented as an easy means of lifting the roof by a total of almost nine feet above the trailered floor height of around four feet. The roof structure is initially lifted slightly beyond the locked position for engagement of a scissor locking bar such that the winches are not supporting the entire roof load during a given event. When the scissor locking bar is supporting the roof structure, the winches are engaged to create slack in the winch cables.

It should be noted that these dimensions may vary while still providing a suitable mobile stage solution.

BRIEF DESCRIPTION OF THE DRAWINGS

The drawings constitute a part of this specification and include exemplary embodiments of the present invention illustrating various objects and features thereof.

FIG. 3 is a front elevational view of the embodiment shown in the first, trailer orientation.

FIG. 7 is a right side elevational view of the embodiment shown in the first, trailer orientation.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Preferred Embodiment Mobile Stage System

Figure 1:
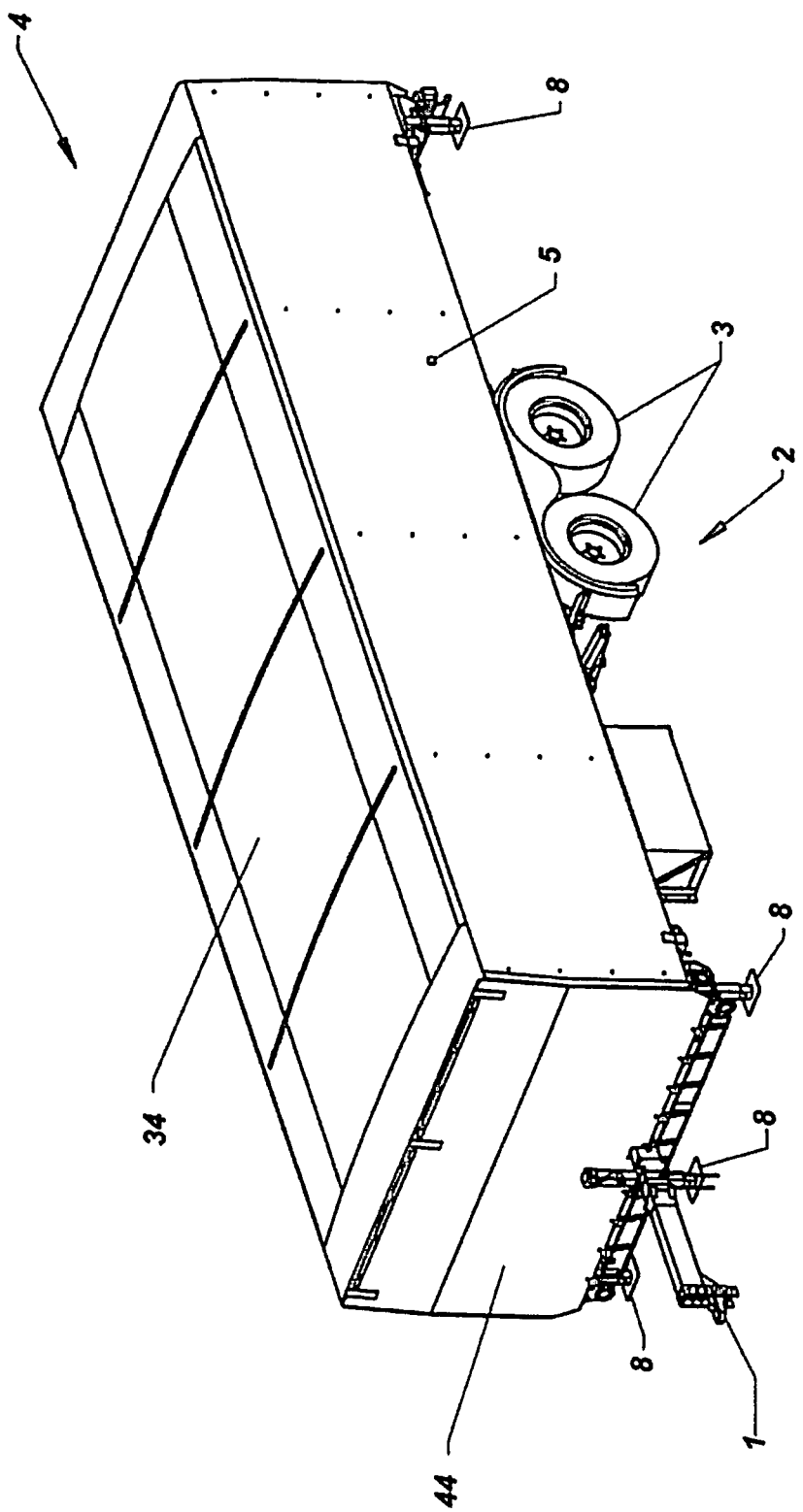
FIG. 1 is a three-dimensional isometric view of a transformable mobile stage system shown in a first, trailer orientation.
Figure 2:
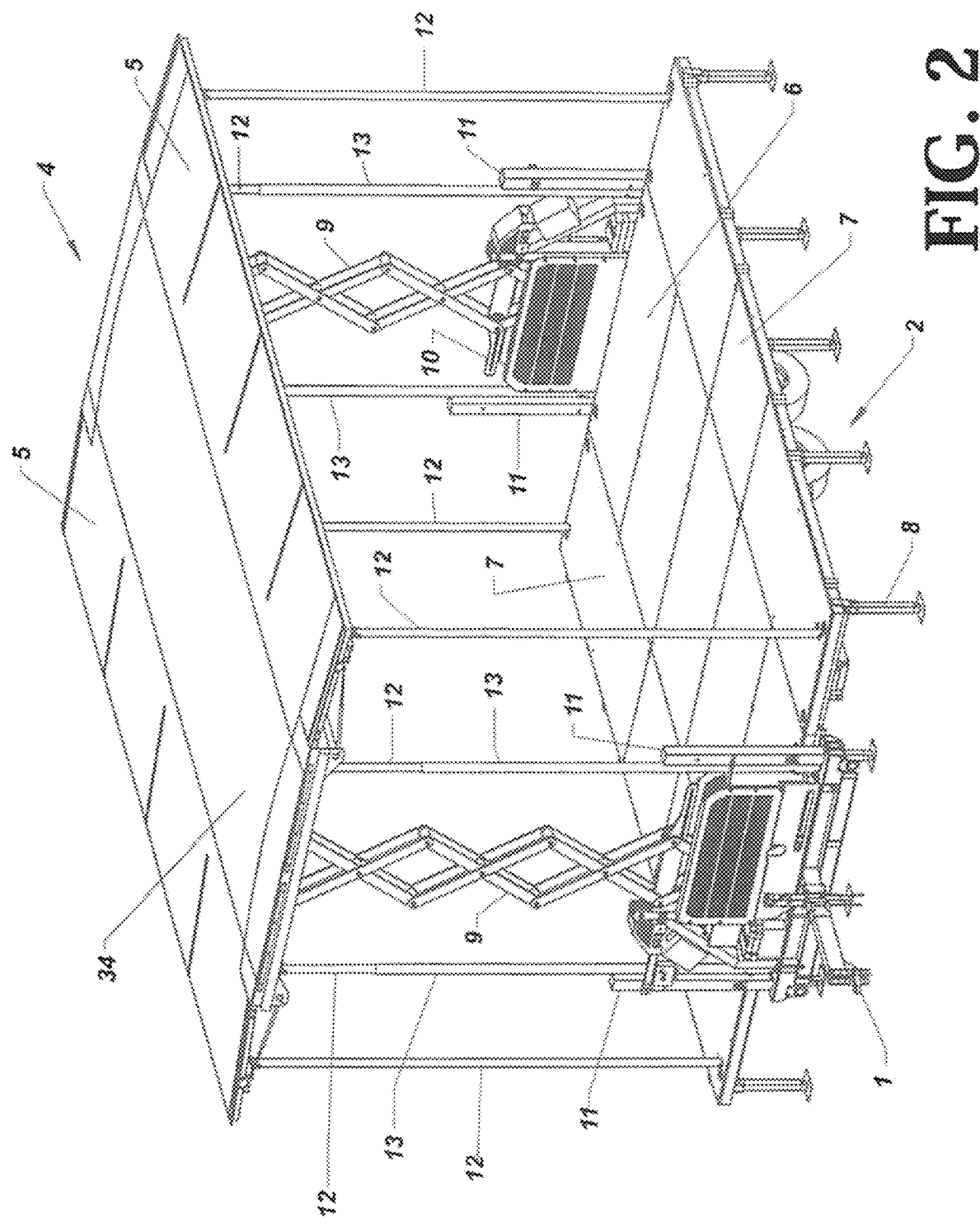
FIG. 2 is a three-dimensional isometric view thereof shown in a second, deployed stage orientation.

A mobile stage system is shown in FIGS. 1-15C. The mobile stage system is transformable between a first, trailer orientation as shown in FIG. 1 and a second, deployed stage orientation as shown in FIG. 2. In the first orientation, the mobile stage system can be towed by any suitable vehicle. When in the second orientation, a secure and stable stage platform is provided, along with all necessary lightning, audio, and other elements readily included.

FIG. 1 shows the mobile stage system in the first, trailer orientation where the trailer 2 including a trailer hitch coupler 1 for towing the entire mobile stage system via a towing vehicle. The roof 4 and sides 5 of the trailer 2 seal the contents inside, providing weatherproof transport. A roof tarp 34 with a roof tarp end 44 can also be included within the roof 4. Also shown are the trailer wheels 3 and drop-leg jacks 8 for stabilizing the trailer 2 at a site.

FIG. 2 shows the mobile stage system in the second, deployed stage orientation where the trailer 2 provides a stage base with the various drop-leg jacks 8 preventing movement of the trailer. The mobile stage system roof 4 and roof tarp 34 form a covering of the stage along with the sides 5 which fold upwards and form part of the roof 4. Several roof down supports 11 and corner towers 12 with corner tower couplers 13 hold the roof 4 and sides 5 above the stage floor and stage floor extensions 7. Two scissor assemblies 9 lift the roof 4 and sides 5 into place.

Figure 3A:
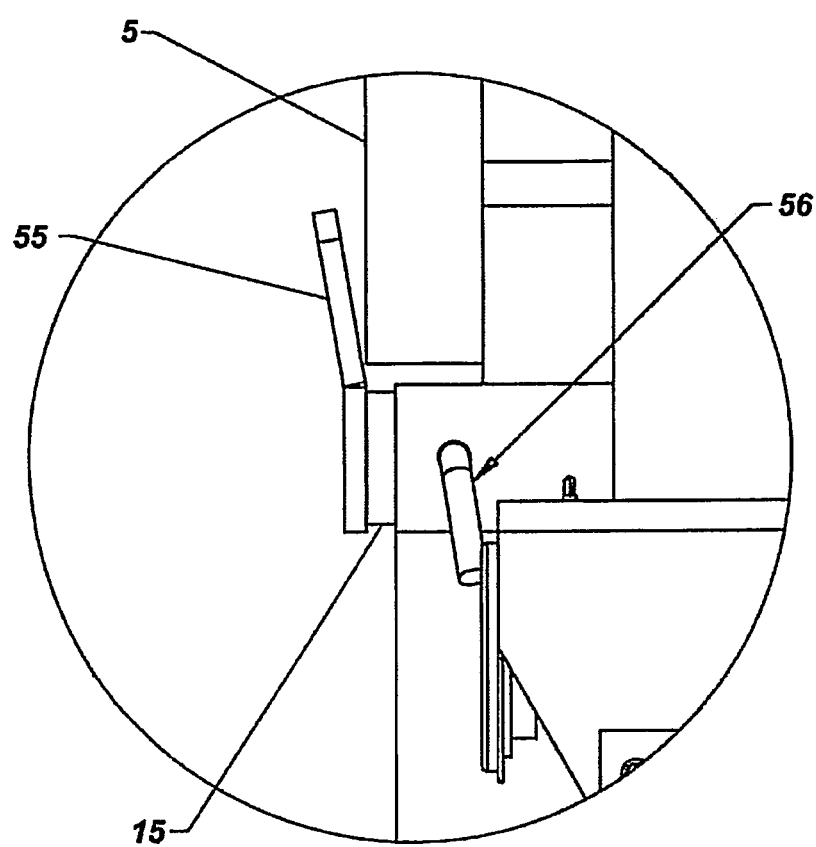
FIG. 3A is a detailed view taken about the circle of FIG. 3.

FIG. 3 shows the front end of the mobile stage system with the trailer 2 in the first, trailer orientation. The drop-leg jacks 8 are retracted such that the wheels 3 can contact the ground so that the entire trailer 2 can roll. Gas springs 14 are located on either side of the stage inside of the sides 5. A winch 16 and battery 17 are included as well to power and control the scissor assemblies 9. FIG. 3A shows the bottom of the side 5 which includes a telescoping tubing 15 which extend out away from the trailer 2 to form the stage floor. An extension stop 55 prevents these from extending prematurely, and a clevis pin 56 is also included for additional security.

Figure 4:
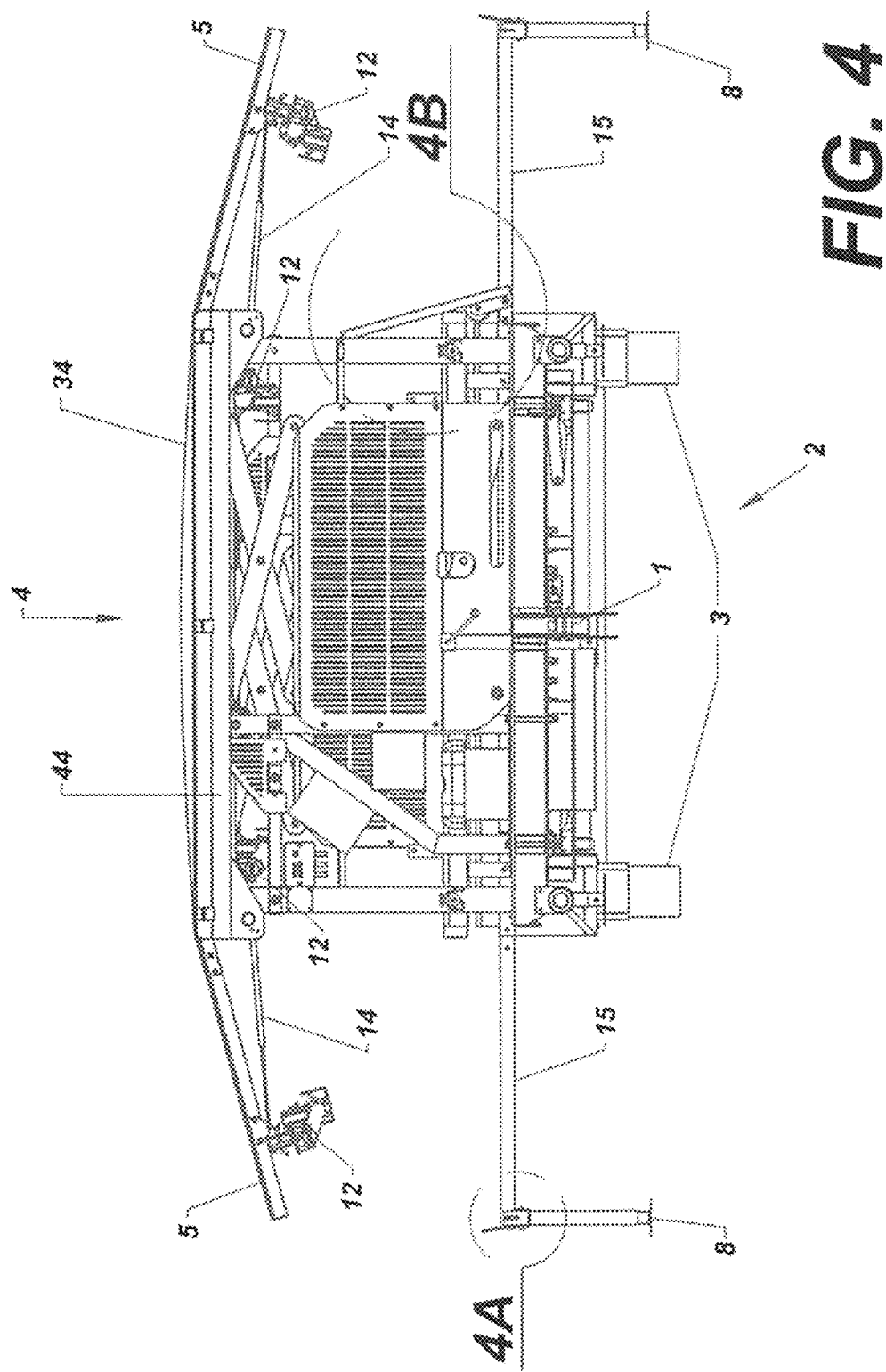
FIG. 4 is a front elevational view of the embodiment shown in the second, deployed stage orientation.

In FIG. 3A, the side/floor extension stop 55 is welded to the telescoping tube 15 and positioned relative to the trailer 2 with the telescoping tube clevis pin 56. This detail is typical on both sides and front and rear of the trailer 2. The sides 5 are held in the position indicated. Referring also to FIG. 4, the sides 5 are unlocked by the removal of the telescoping tube clevis pin 56 allowing the telescoping tube 15 to move outward as seen in FIG. 4. Moving the telescoping tubing outward unlocks the sides 5 from the position shown in FIG. 3. In FIG. 3 it should be noted that the roof 4 in the down position is supported by a total of four roof down supports 11 (two shown) at each corner of the mobile stage.

Figure 4A:
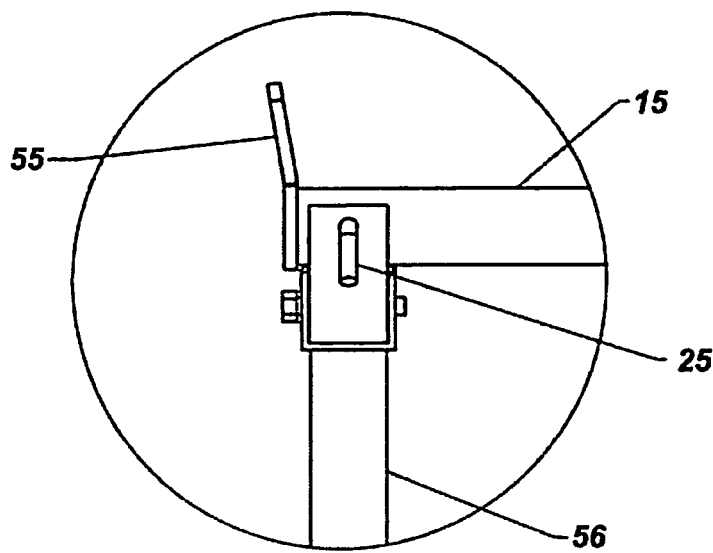
FIG. 4A is a detailed view taken about the circle of FIG. 4.
Figure 4B:
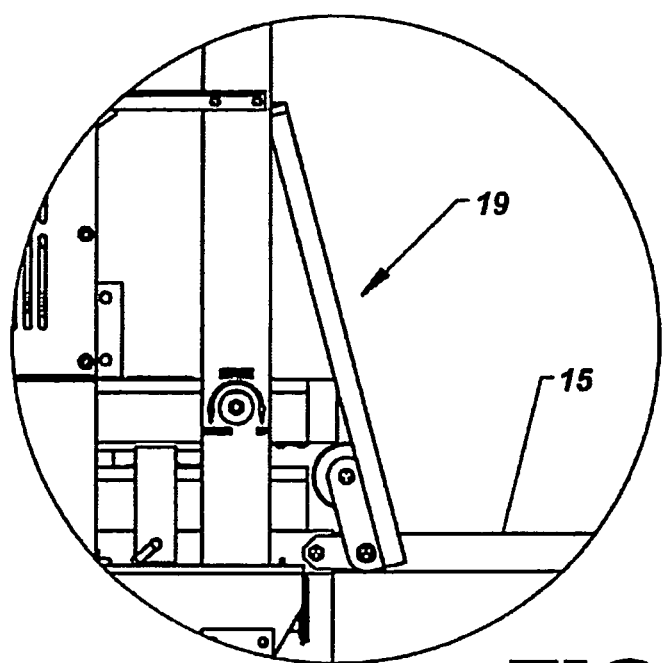
FIG. 4B is a detailed view taken about the circle of FIG. 4.

FIG. 4 shows the stage being partially deployed, where the two telescoping tubing elements 15 on either side extend out an where the drop-leg jacks 8 are extended to secure the stage floor. FIG. 4A shows a second clevis pin 25. FIG. 4B shows the right floor extension tool 18 as it interfaces with the telescoping tube element 15 on that side, which functions to extend the telescoping tube element 15 to expand the floor of the stage.

Figure 5B:
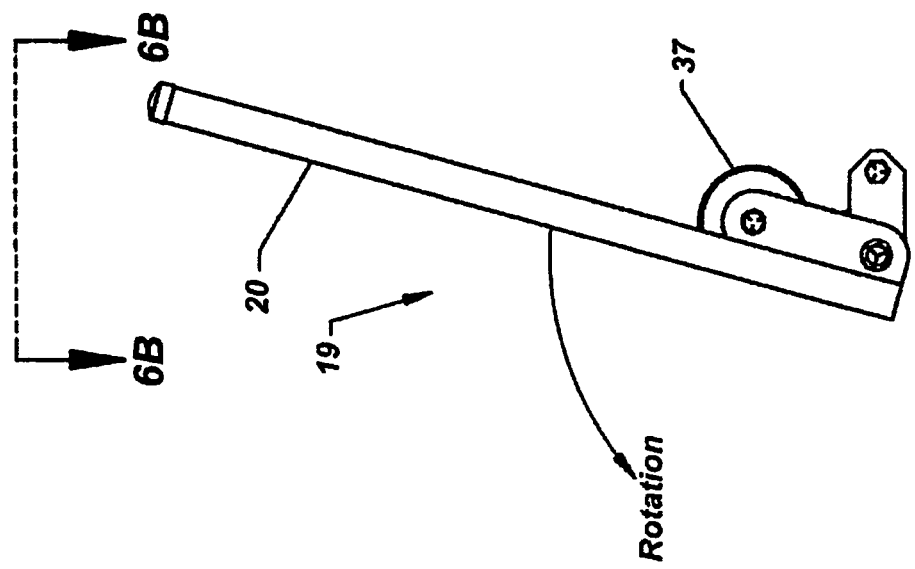
FIG. 5B is an elevational view of a right floor extension tool.
Figure 5A:
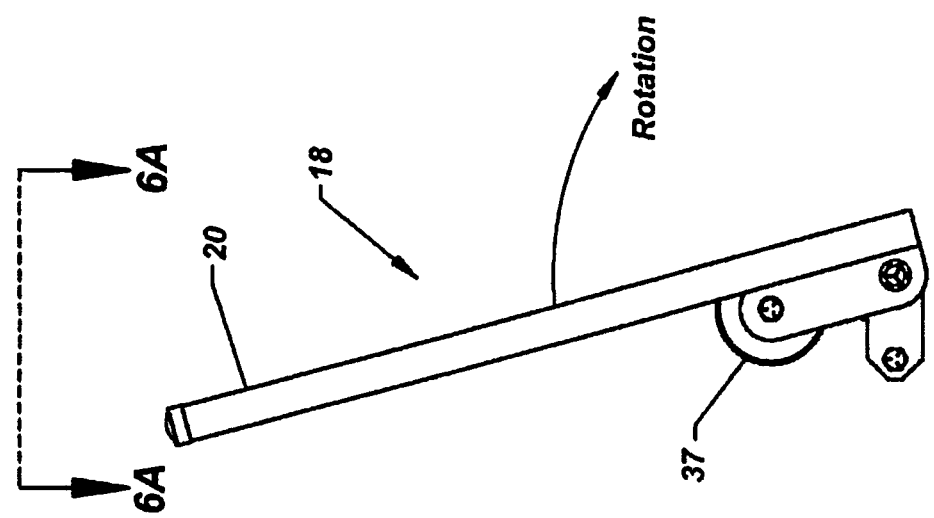
FIG. 5A is an elevational view of a left floor extension tool.
Figure 6A:
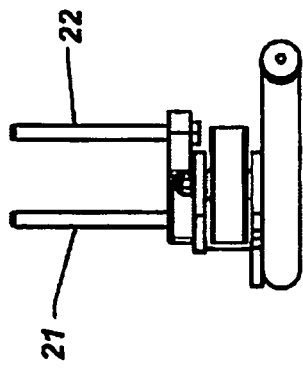
FIG. 6A is a top plan view about the arrows shown in FIG. 5A.
Figure 6B:
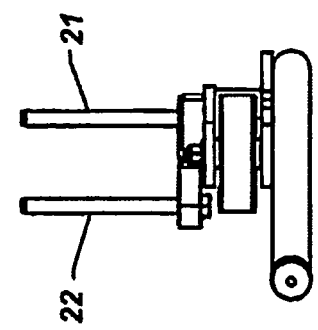
FIG. 6B is a top plan view about the arrows shown in FIG. 5B.

In FIG. 4, the sides 5 are rotatable about a pivot point on the roof 4. The sides 5 may rotate to some position as indicated due to implementation of a total of ten gas springs 14 (five gas springs 14 per side 5). In FIG. 4A, the telescoping tube 15 is moved outward to a point where the left floor extension tool 19 (shown separately in FIG. 5B) can be fully inserted through the holes previously occupied by the telescoping tube clevis pin 56 and an additional hole in the telescoping tube 15. The right floor extension tool 18 is installed at the other end of the trailer 2 (refer to FIG. 5A). The right and left floor extension tools, 18 and 19 respectively, are oriented as shown in FIG. 4B. Additionally in FIG. 4, one roof tarp end 44 of the roof tarp 34 is rolled upward and secured by additional features of the roof tarp 34. Similarly, this would be done on the other end of the mobile stage. FIGS. 5A and 5B show the left 18 and right 19 floor extension tools, respectively. Each includes a roller 37 and a floor tool lever 20. FIGS. 6A and 6B show the respective top plan view of FIGS. 5A and 5B, including floor tool pivot pins 21 and floor tool stationary pins 22.

Figure 7A:
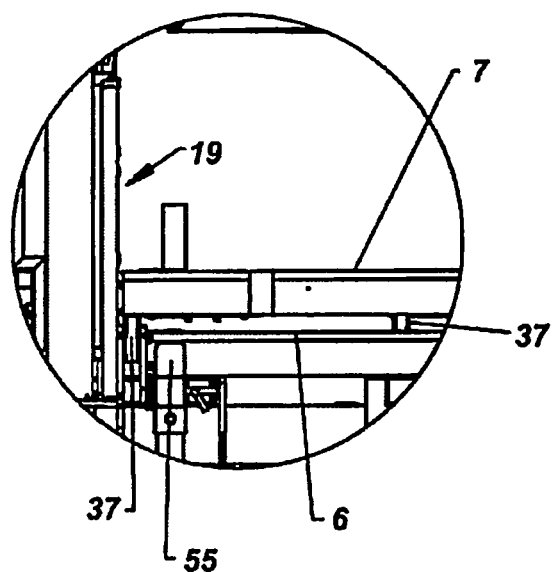
FIG. 7A is a detailed view taken about the circle of FIG. 7.
Figure 7B:
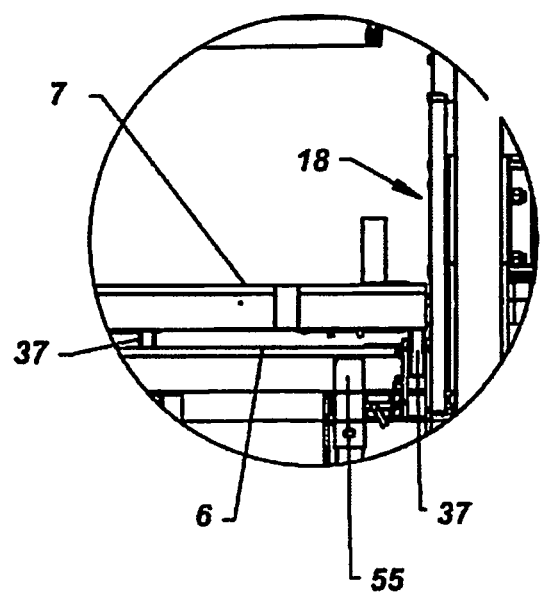
FIG. 7B is a detailed view taken about the circle of FIG. 7.

FIG. 7 shows a right side elevational view of the mobile stage system in the first, trailer orientation being transformed into the second, deployed stage orientation wherein the telescoping tubes 15 have expanded to provide for stage floor extensions 7 to be installed alongside the main stage floor 6. FIG. 7A shows additional detail about the right floor extension tool 18 with roller 37 interfacing with the extension stop 55 and the floor extension 7 and main stage floor. FIG. 7B mirrors this and shows the left side extension tool 19. On both floor extension tools, the roller 37 is indicated. In a preferred embodiment, there are ten rollers 37 attached to the underside of each floor extension 7 which contact the main stage floor 6 as shown (two indicated). The rollers 37 mounted to the stage floor extensions 7 are such that these can be rolled on the main stage floor 6 in one direction (in or out of the page shown in FIG. 7)

Figure 8:
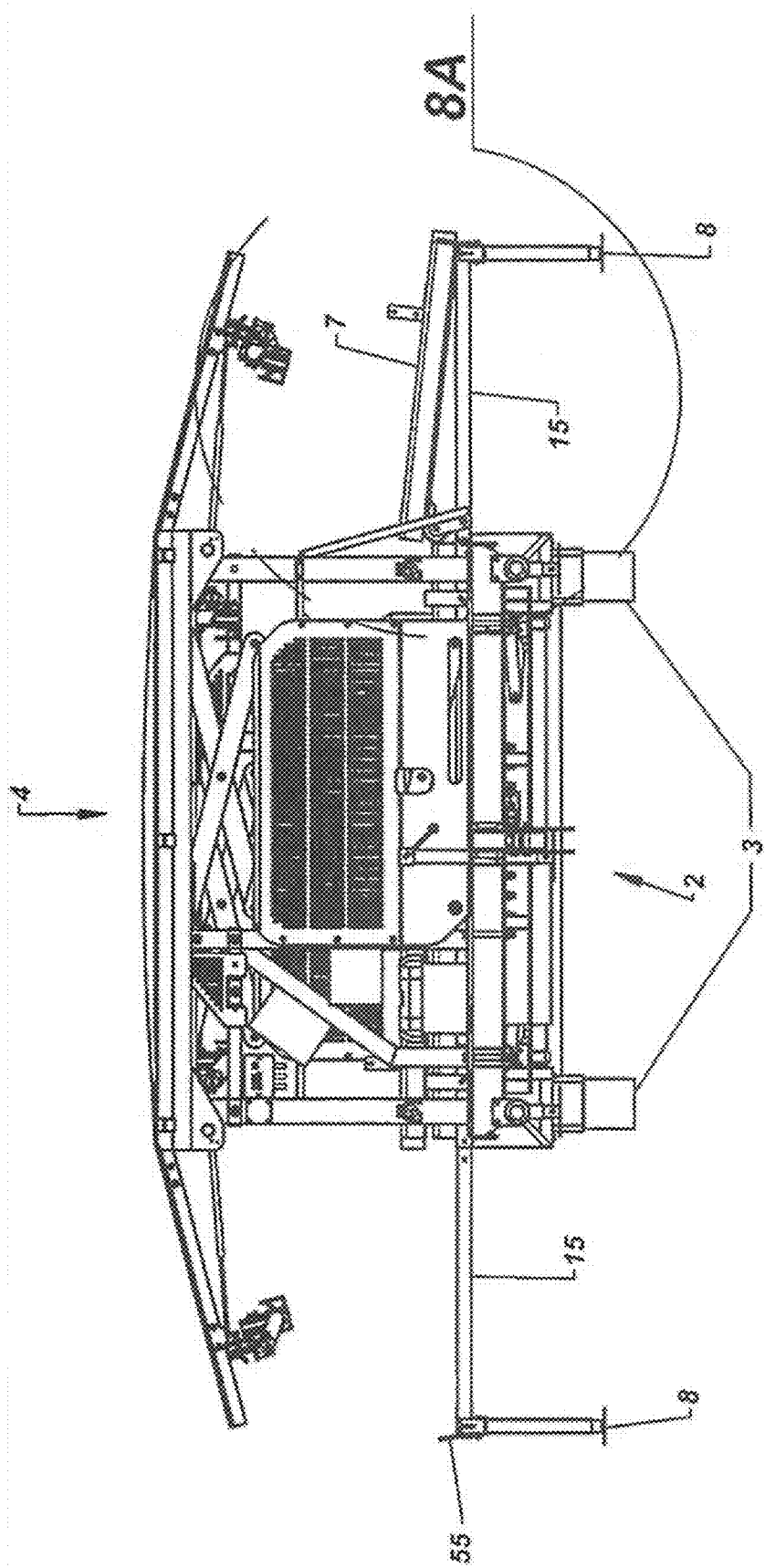
FIG. 8 is a front elevational view of the embodiment shown in the second, deployed orientation including a stage floor extension element being deployed.
Figure 8A:
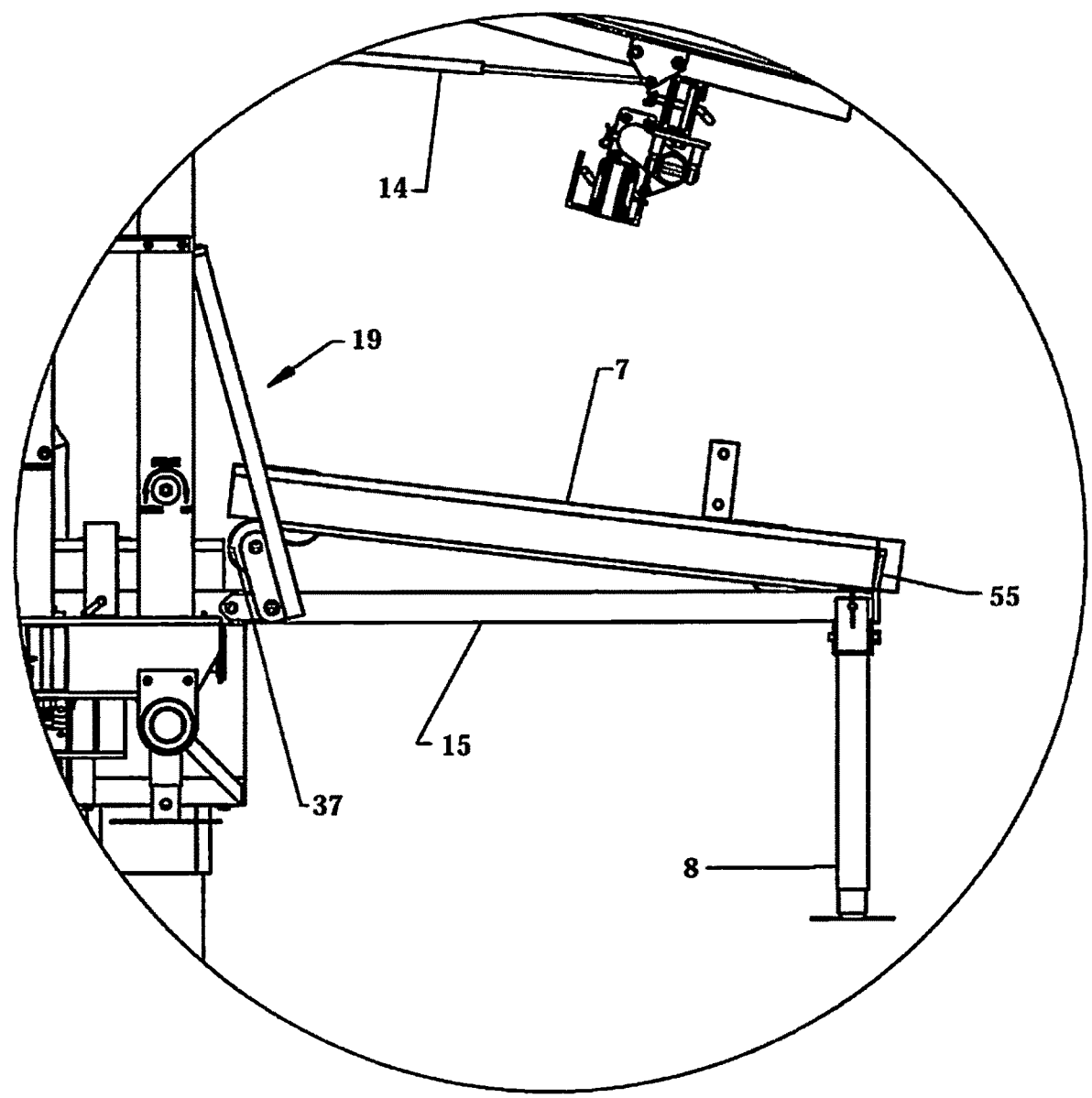
FIG. 8A is a detailed view taken about the circle of FIG. 8.

FIG. 8 shows the floor extension 7 being installed atop the telescoping tubing 15. FIG. 8A shows more detail, including the sides 5 being lifted by the gas springs 14, the right floor extension tool 18 rolling along the telescoping tube 15, with the floor extension 7 being placed adjacent to the extension stop 55. Only one stage floor extension 7 is shown rolled out as previously mentioned to the final point where the contact is made between the stage floor extension 7, and both the telescoping tubing 15 and the side/floor extension stop 55. During the process of moving the stage floor extension 7 outward, a point is reached where it will want to easily rotate downward based on the rollers 37 of the right and left floor extension tools, 18 and 19 respectively, due to the weight of the stage floor extension 7. This downward rotation may occur before contact is made with the side/floor extension stop 55. The stage floor extension 7 is easily pulled outward sliding on the telescoping tube 15 until in the final position shown in FIG. 8.

Figure 9:
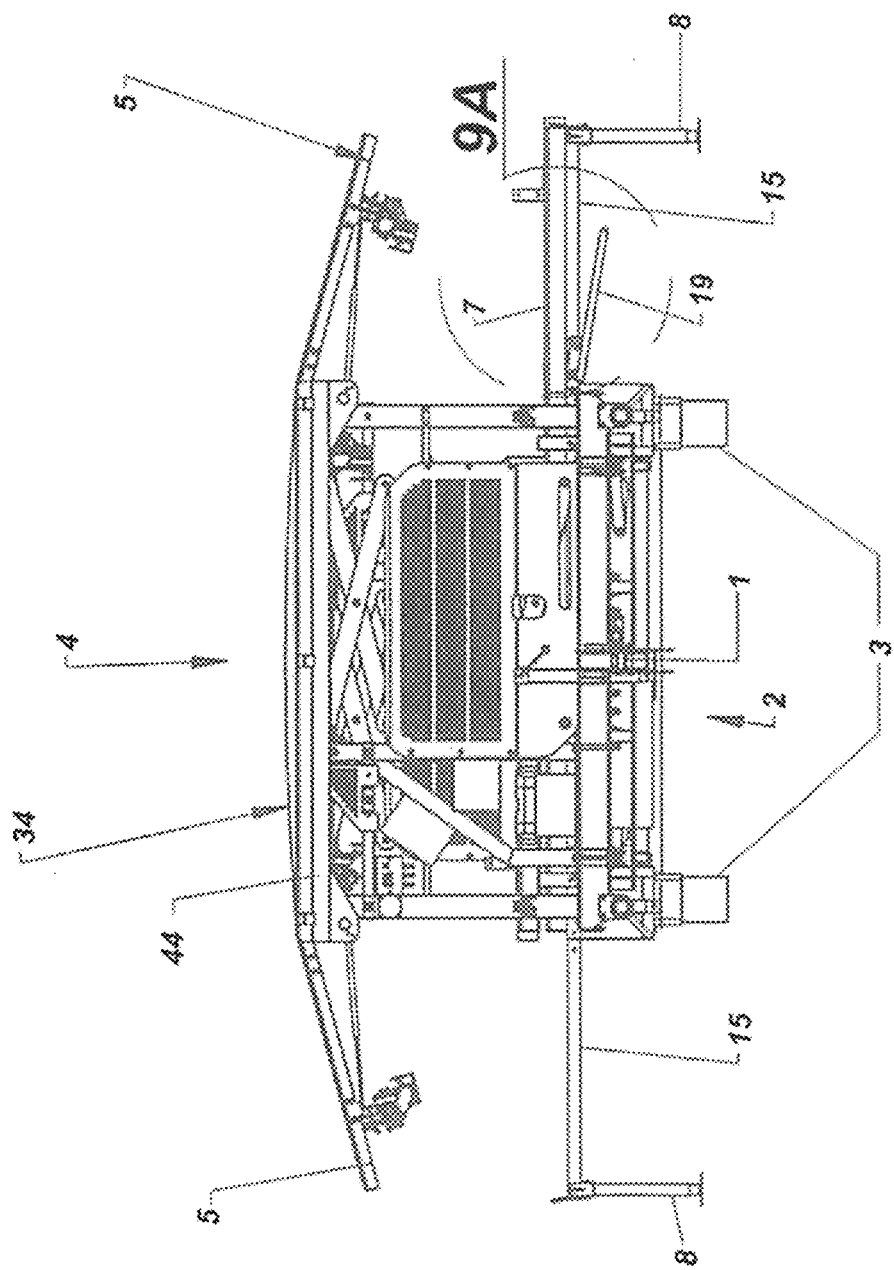
FIG. 9 is a front elevational view of the embodiment of FIG. 8 wherein the stage floor extension is in a second step.
Figure 9A:
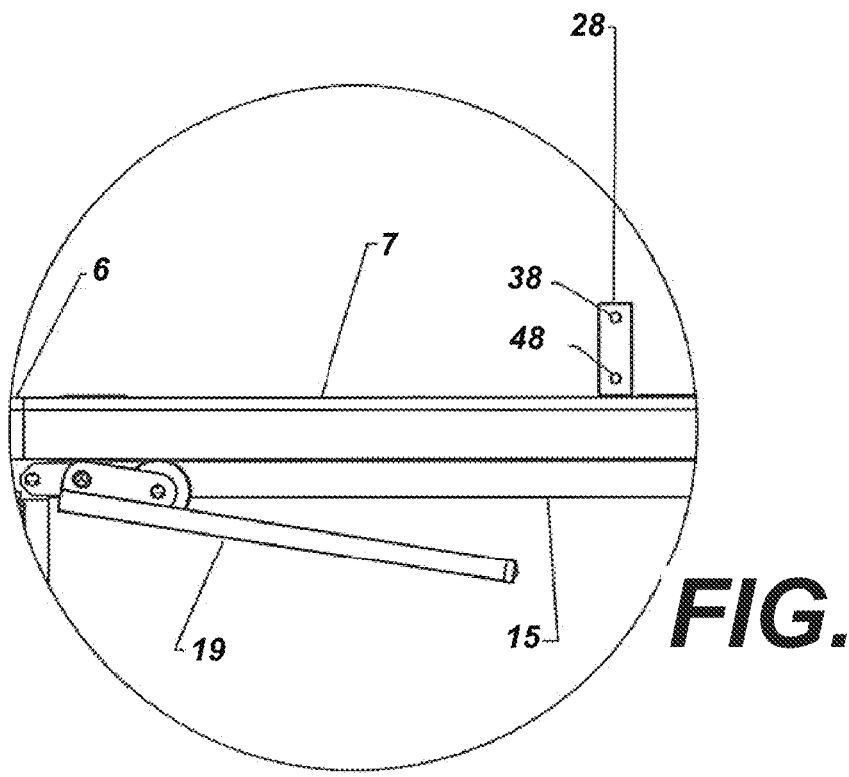
FIG. 9A is a detailed view taken about the circle of FIG. 9.
Figure 10A:
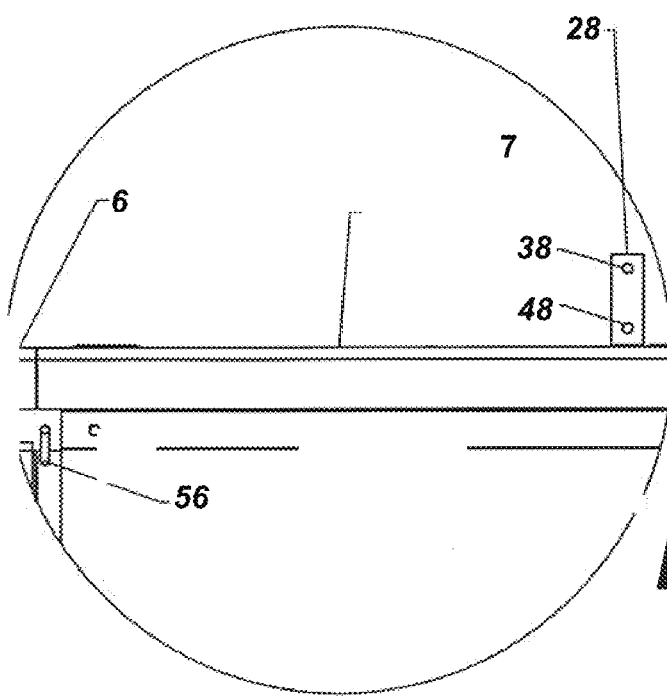
FIG. 10A is a detailed view taken about the circle of FIG. 10.
Figure 10:
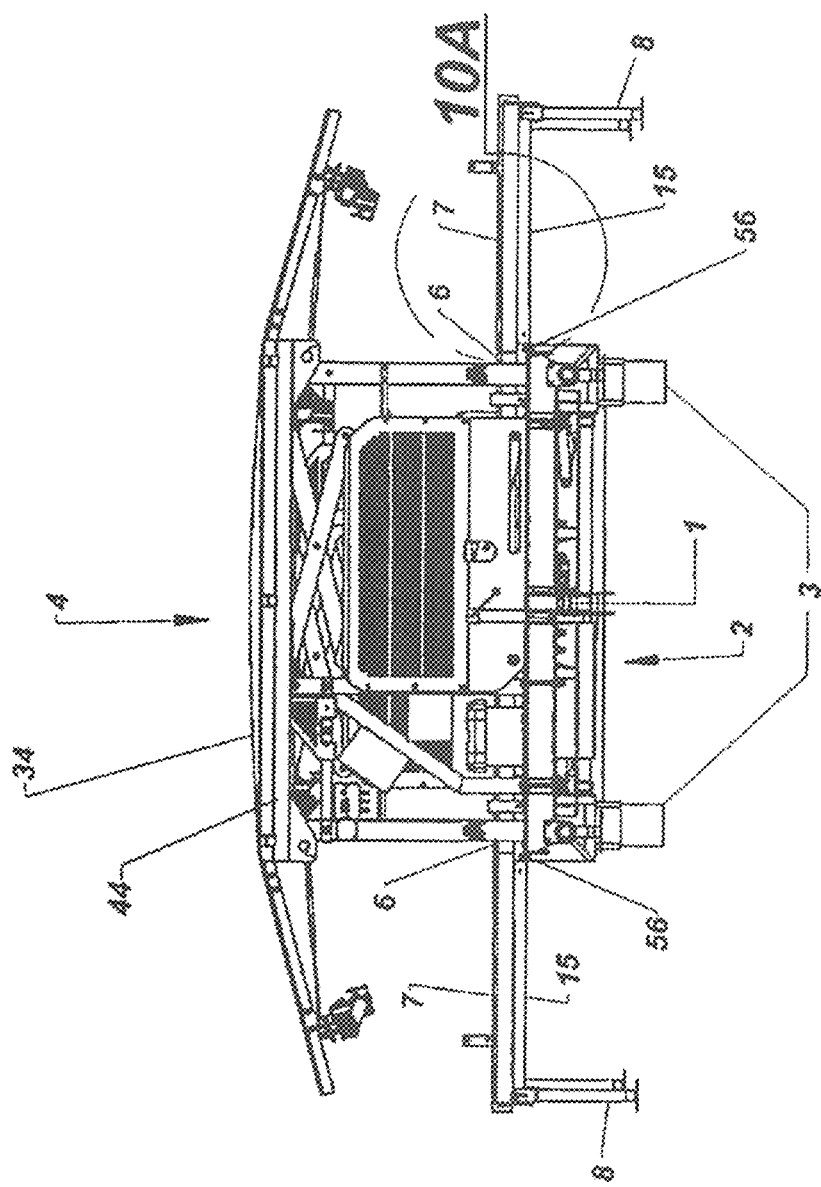
FIG. 10 is a front elevational view of the embodiment of FIG. 9 wherein the stage floor extension is in a third step.

FIG. 9 shows the floor extension 7 installed and the right floor extension tool 19 rotated beneath the floor extension. FIG. 9A shows this in more detail, including a floor tube 28 with a pitch hole down 38 and a pitch hole up 48. Similarly, FIG. 10 shows the clevis pin 56 locking away the right floor extension tool 18, with FIG. 10A showing this in more detail. Both right and left floor extension tools, 18 and 19 respectively, are rotated as indicated in FIG. 5 to lower the stage floor extension 7 onto the telescoping tube 15 such that it is parallel to the main stage floor 6 and the full weight of the stage floor extension 7 is held by the telescoping tube 15. At this point, the right and left floor extension tools, 18 and 19 respectively, can be removed and replaced with the previously removed telescoping tube clevis pin 56 as shown in FIG. 10A. Inserting the pin 56 as shown will not allow the telescoping tube to move outward further from the trailer 2. The same procedure is followed on the other side of the trailer 2 resulting in both stage floor extensions 7 being parallel to the main stage floor 6. Beginning with FIG. 4, a drop-leg jack 8 is indicated at the end of the telescoping tube 15 held in place with a clevis pin 25. This is typical on all four of the telescoping tubes 15 and are used to support additional loading and level the stage floor extensions 7. In fact, after the stage floor extensions 7 are as shown in FIG. 10, three additional drop-leg jacks 8 are attached to each stage floor extension 7 with clevis pins 25 for leveling and load bearing.

Figure 11:
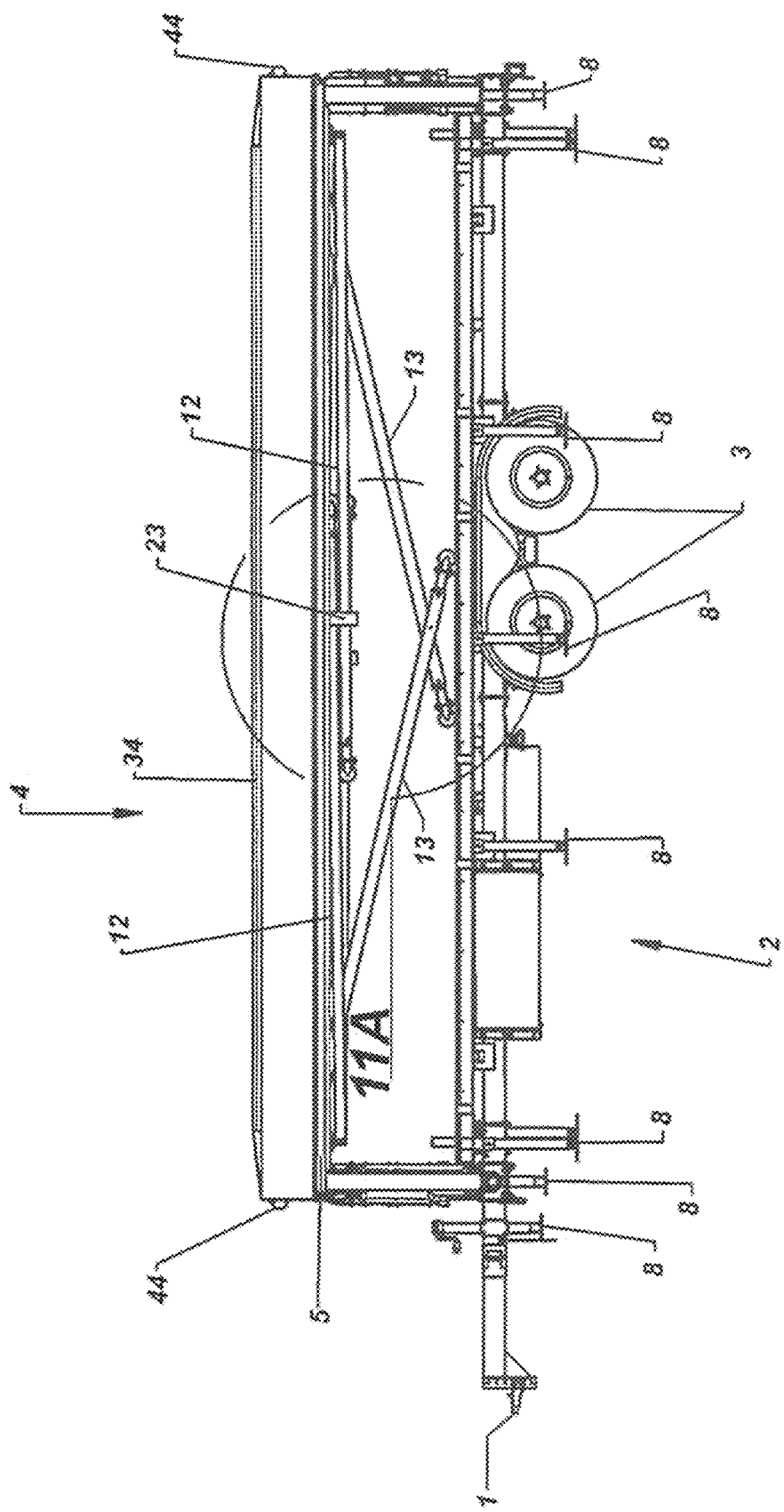
FIG. 11 is a right side elevational view of the embodiment shown in the first, trailer orientation showing corner tower couplers being deployed.
Figure 11A:
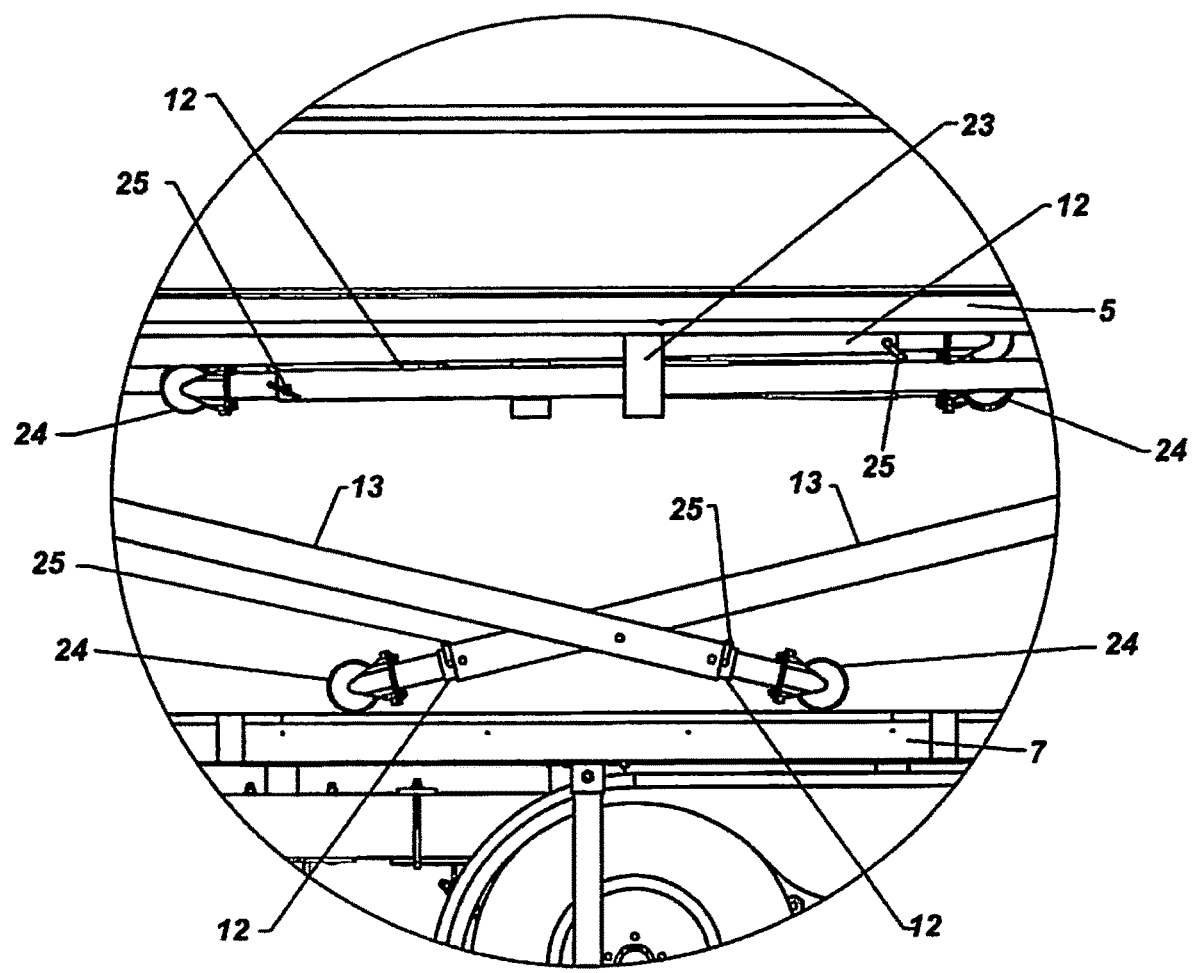
FIG. 11A is a detailed view taken about the circle of FIG. 11.

FIG. 11 shows the trailer 2 being transformed with the corner tower couplers 13 including roller assemblies 24 (as shown in FIG. 11A). A corner tower hanger 23 is connected two the corner towers 12 which can be detached and connected to the corner tower couplers 13 as the roof 4 is raised. Clevis pins 25 secure the roller assemblies 24 to the bottom of the corner tower couplers 13. The corner towers 12 also have roller assemblies 24 secured via clevis pins 25.

In a preferred embodiment, there are a total of eight corner towers 12 permanently attached to the roof 4 and sides 5. The corner towers 12 rotate and pivot relative to the roof 4. In the mobile stage trailered position, all eight corner towers 12 are supported by a total of four corner tower hangers 23 (two corner towers 12 per corner tower hanger 23). All the corner towers 12 have a roller assembly 24 attached to the free end by use of a clevis pin 25 as shown. Roof 4 corner towers 12 also have a corner tower coupler 13 as indicated. In FIG. 11, the four corner towers 12 have been removed from the roof 4 down to where the roller assembly 24 contacts the stage floor 6 (only two visible). The remaining four corner towers 12 are shown in FIG. 11A supported by the corner tower hanger 23 on the sides 5. Before the roof 4 is raised, the remaining corner towers 12 are lowered to the stage floor extensions 7. The four corner tower hangers 23 are basically centered between the front and back of the roof 4 and sides 5 as indicated in FIG. 6 and may be removed and stored prior to raising the roof 4.

Figure 12:
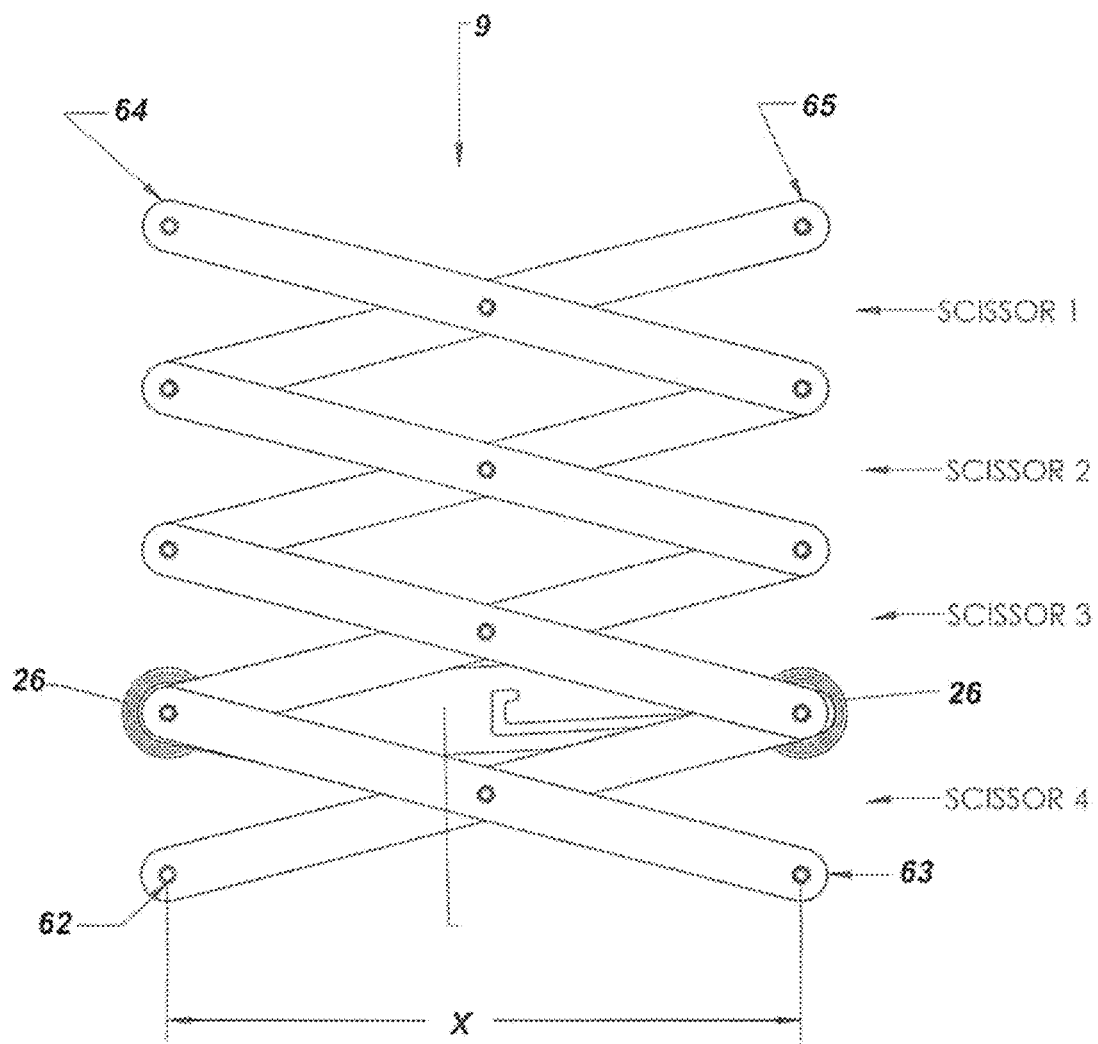
FIG. 12 is a side elevational view of a scissor lift element of the present invention.

FIG. 12 shows one of the scissor assemblies 9 which includes at least four scissors. Winch cable pulleys 26 are connected between scissor three and scissor four. The bottom end of the scissor assembly includes an attachment 62 to the trailer 2, and a roller 63 which rolls along the trailer 2. Similarly, the top end of the scissor assembly 9 includes an attachment 64 to the roof 4 and a roller 65 for rolling along the roof 4. This allows the scissor to extend and contract as the scissor raises. Dimension "X" corresponds to the scissor assembly 9 when the mobile stage is in the first, trailer orientation.

Figure 14:
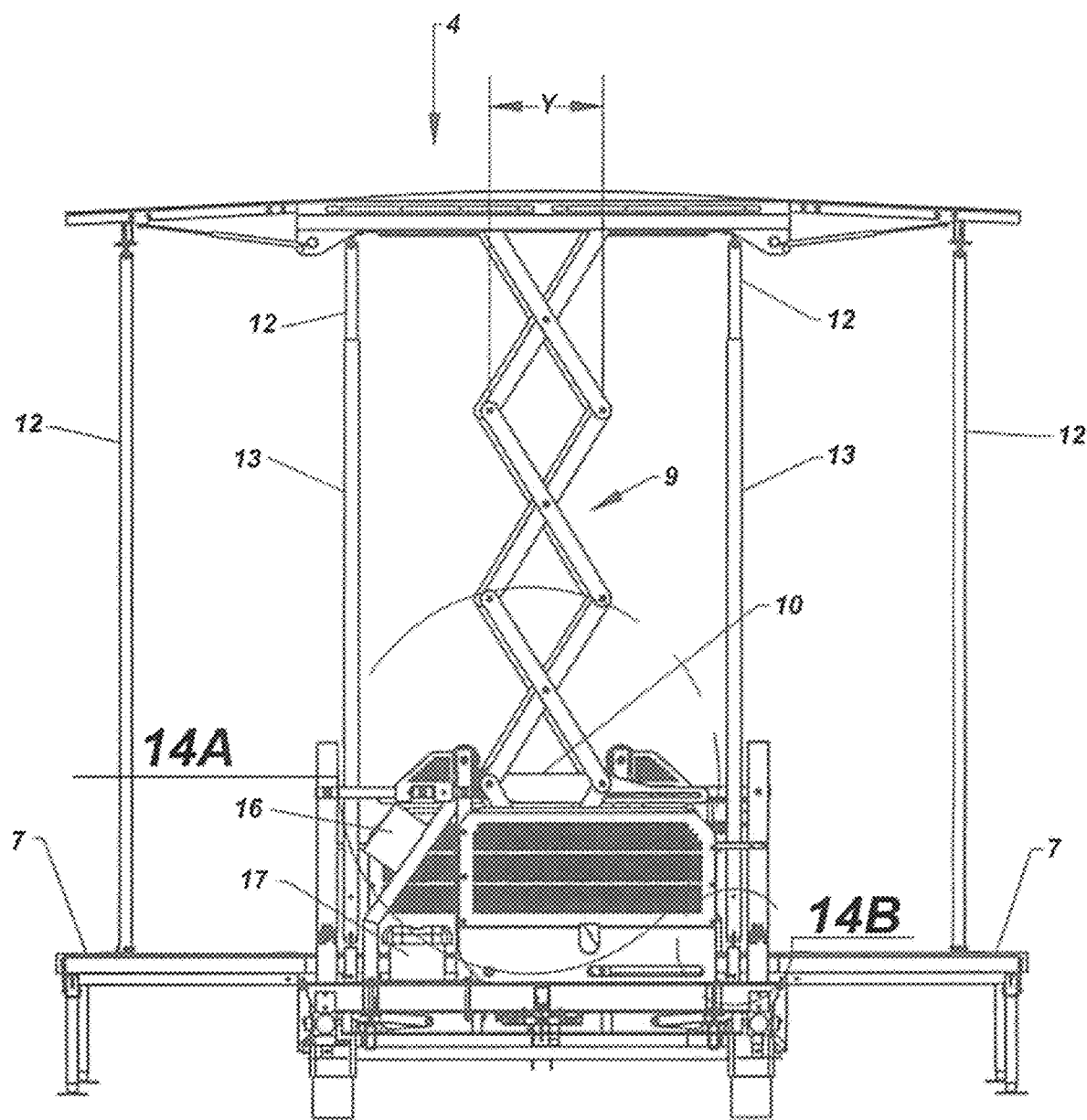
FIG. 14 is a front elevational view of the embodiment shown in the second, deployed stage orientation wherein the scissor lift elements are engaged.
Figure 14A:
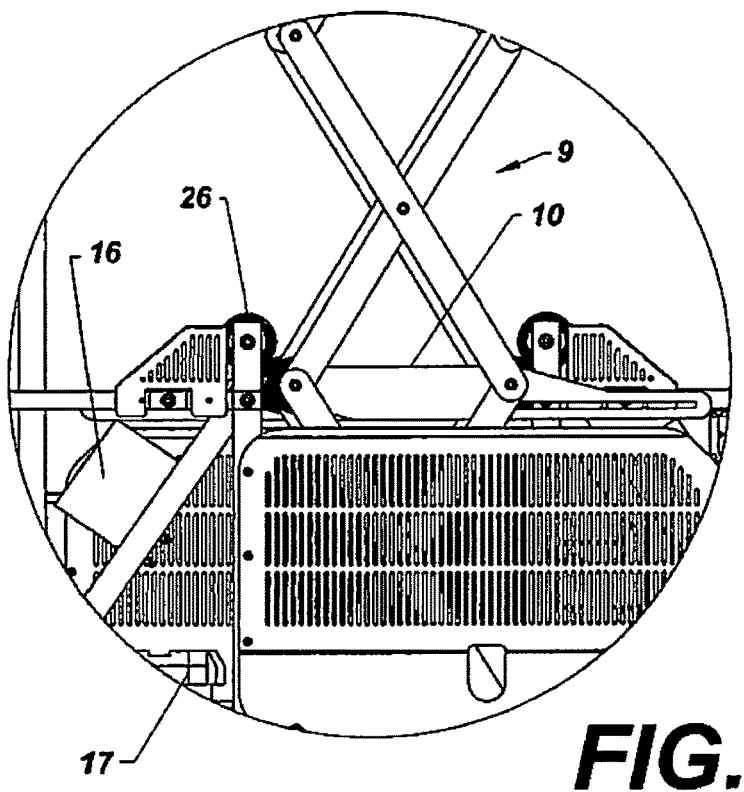
FIG. 14A is a detailed view taken about the circle of FIG. 14.

Referring to FIGS. 12 and 14A, a winch 16 is shown with two additional winch cable pulleys 26. The winch cable pulleys winch 16 are fixed to the trailer 2. The winch 16 spools a winch cable in or out based on power supplied by a battery 17 providing sufficient force to move the scissor assembly 9. The winch cable (not shown) is fed over one winch cable pulley down to a second winch pulley (refer to FIG. 12), over and around a third winch pulley, back to a fourth winch pulley, up and around a fifth winch pulley to be anchored at some point on the trailer 2. There are two winches 16 and batteries 17 to operate the scissor assemblies 9. The winches are powered separately such that corrections can be made during lifting or lowering the roof 4 and sides 5.

Figure 13:
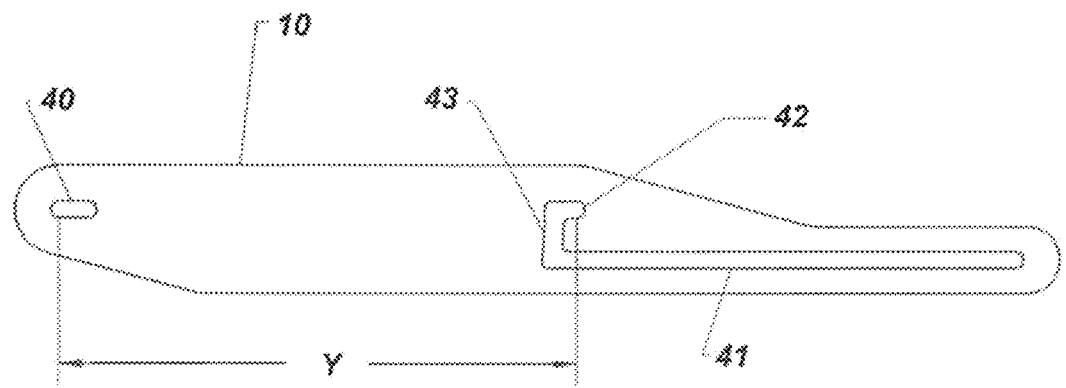
FIG. 13 is a side elevational view of a lock bar element of the present invention.
Figure 15:
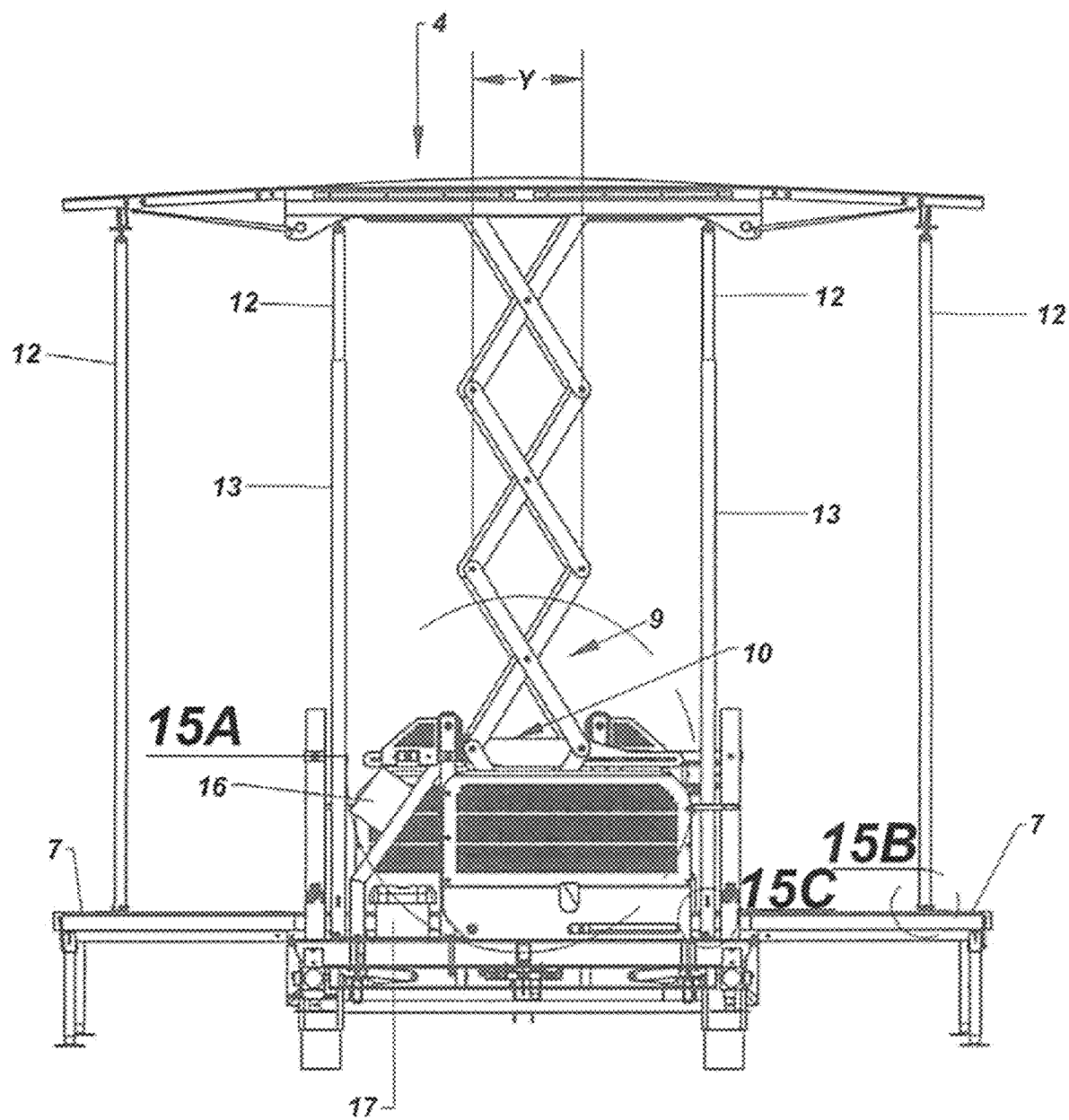
FIG. 15 is another front elevational view of the present invention.

FIG. 13 shows a lock bar, including slots 40, 41, 42, 43. These slots coincide with the pins of the scissor lift assembly 9 and lock it out as described below. When the scissor assembly 9 is as shown in FIG. 12 at dimension "X", the scissors move to some extent through slot 40 and mainly through slot 41. As the scissor assembly 9 moves from the larger dimension "X" to the smaller dimension "Y", the scissor assembly 9 grows in height. At a dimension less than dimension "Y", the lock bar 10 will tend to pivot downward on the scissor assembly 9 corresponding to scissor movement in slot 43. Once the lock bar 10 is horizontal, i.e., level to the stage floor 6, the scissor movement is reversed riding in slot 42 until no further movement is possible. When no more movement of the scissors is possible, the scissor assembly 9 is locked in place by the lock bar 10. In the scissor locked position, the roof 4 is in the position indicated in FIG. 2 and defined by the dimension "Y". Dimension "Y" is also shown in FIGS. 14 and 15 for reference. For lowering the roof 4 down to the trailered position (FIG. 1), the scissor assembly 9 moves to a dimension less than dimension "Y", i.e., raising roof 4 to a point where the operator can move the lock bar 10 such that the scissors move down in slot 43 to move in slot 41. This would be performed on both scissor assemblies 9.

While the roof 4 is being raised, the roller assemblies 24 attached to the corner towers 12 rolls on top of the main stage floor 6 or stage floor extensions 7. Once the scissor assemblies 9 are locked by the lock bars 10, the roller assemblies 24 are removed from the four corner towers 12 that are attached to the roof 4 by holding the corner tower coupler 13 in place, remove the clevis pin 25 to allow the roller assembly 24 to be removed and re-installing the clevis pin 25 to support the corner tower coupler 13 to the corner tower 12 (see also FIG. 14B).

Figure 14B:
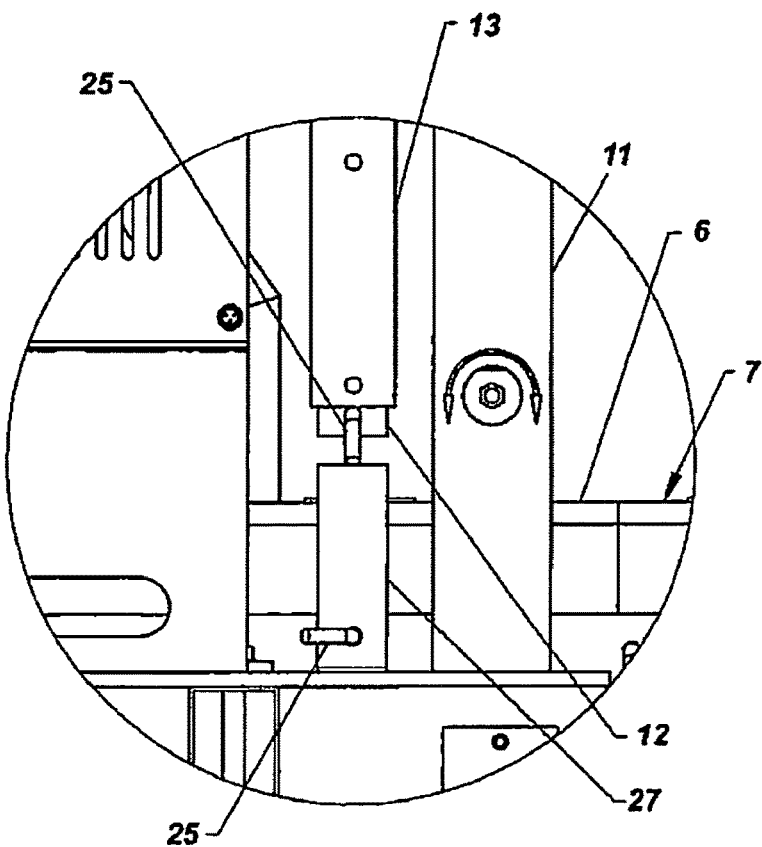
FIG. 14B is a detailed view taken about the circle of FIG. 14.

FIG. 14 shows a front elevational view of the stage shown in a nearly fully deployed stage orientation with the scissor assembly 9 fully extended upwardly to raise the roof 4, roof tarp 34, and sides 5 above the trailer 2, including main stage floor 6 and floor extensions 7. FIG. 14A shows the lock bar 10 which connects to the scissor assembly 9 and locks it out, physically preventing it from falling. FIG. 14B shows how the clevis pins 25 lock out the corner tower couplers 13 and the corner towers 12 via the stage tube 27.

In FIG. 14B, one of the four corner towers 12 is shown with the corner tower coupler 13 held by the clevis pin 25. Also shown is the stage tube 27 which is attached to the trailer 2 and has a clevis pin 25 which should be removed first. The corner tower 12 and coupler 13 should be rotated aligning the holes as shown in FIG. 14B. While holding the corner tower coupler 13, remove the clevis pin 25 on the corner tower 12 and lower the corner tower coupler 13 onto the stage tube 27. Insert both clevis pins 25, one through the corner tower coupler 13 and the stage tube 27, and one through the corner tower coupler 13 and the corner tower 12 (see FIG. 15B). Repeat this on the remaining four corner towers 12 attached to the roof 4.

Figure 15A:
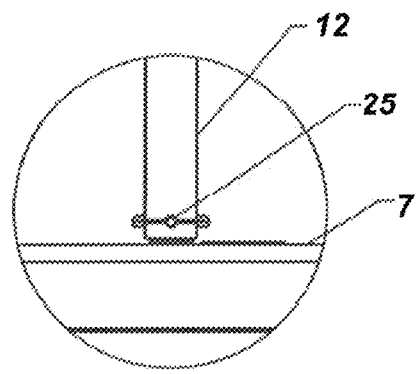
FIG. 15A is a detailed view taken about the circle of FIG. 15.
Figure 15B:
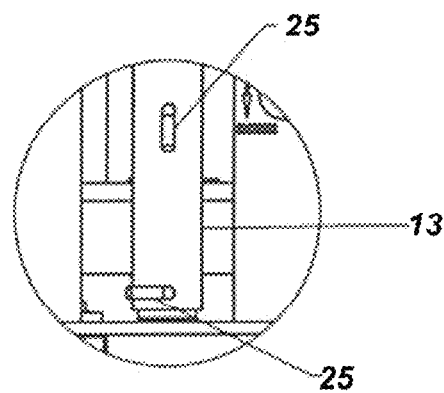
FIG. 15B is a detailed view taken about the circle of FIG. 15.

FIG. 15 shows a front elevational view of the stage shown in a fully deployed stage orientation. FIGS. 15A and 15B show additional details locking out the various elements.

In FIG. 15A, a corner tower 12 attached to one of the sides 5 is shown attached to the stage floor extension 7 with a clevis pin 25. As shown in FIG. 15A, and referring to FIG. 10A, the corner tower 12 is attached to the stage floor extension 7 through hole 48 in floor tube 28 which creates a pitch down orientation of the side 5, i.e., the side 5 is lower at the corner tower 12 than at the roof 4. The floor tube 28 is mounted to the stage floor extensions 7 directly below each corner tower 12 attached to the sides 5. If the corner tower 12 were attached with the clevis pin 5 through hole 38 in floor tube 28, the result would have been a pitch up condition, i.e., the side 5 at the corner tower 12 position would be higher than that at roof 4.

The tower lifting system is comprised of mast towers that are lifted by a 6 ft-throw solid square hydraulic ram that moves the towers in location in 6 ft increments with each tower being pinned in position as they are moved into place. There are multiple advantages to this system. First, the towers go up rigid reducing the amount lean that occurs compared to other lifting systems. Not only is this safer, but this rigidity is required for one of the other new design features, a new spanner beam deployment system. Furthermore, the new tower design uses a (relatively) small 6 ft throw hydraulic ram. By using a smaller, simple, single-stage cylinder, the design eliminates the need to use a large multistage cylinder and/or another type of drive system. This reduces manufacturing cost, maintenance cost, weight, complexity, and stress on the hydraulic system. It also increases the useful life of the lift system and its safety of the stage during deployment.

It is to be understood that while certain embodiments and/or aspects of the invention have been shown and described, the invention is not limited thereto and encompasses various other embodiments and aspects. For example, the mobile stage can be configured as a trailer or a stand-alone vehicle. Motive power can be provided by self-propelled vehicles for over-the-road transport, by draft animals, e.g., in a horse-drawn configuration, and by individuals. Moreover, in the first, trailer orientation, the mobile stage can be stored between events and deployments. In addition, should the batteries 17 be depleted, the mobile stage can be fully deployed or trailered manually with the tools supplied with the winch 16.

Having thus described the invention, what is claimed is new and desired to be secured by Letters Patent is:

1. A mobile stage system comprising:
   a mobile stage assembly configured to be transformed from a first, trailer orientation to a second, deployed stage orientation;
   a roof comprising a roof tarp having roof tarp ends, said roof connected to a pair of sides configured to be folded down in said first, trailer orientation and wherein said pair of sides are further configured to be rotated upwards to form a roof portion via a pair of gas cylinders when transformed into said second, deployed stage orientation;
   a trailer comprising a stage floor and a trailer hitch;
   a pair of scissor assemblies each, each one of said pair of scissor assemblies powered by a respective battery;
   a plurality of drop-leg jacks connected to said trailer, each of said plurality of drop-leg jacks configured to transform from a first, retracted orientation when said mobile stage assembly is in said first, trailer orientation, to a second, extended orientation when said mobile stage assembly is in said second, deployed stage orientation;
   a pair of lock bars, each one of said pair of lock bars configured to interface with a respective one of said pair of scissor assemblies;
   each of said pair of lock bars comprising a first slot, a second slot, a third slot, and a fourth slot;
   wherein said first slot, said second slot, and said fourth slot are horizontally oriented along each respective one of said pair of lock bars;
   wherein said third slot is vertically oriented to join said second slot and said fourth slot, forming a continual opening within each respective one of said pair of lock bars;
   each one of said pair of lock bars configured to lock the respective one of said pair of scissor assemblies at a width less than their original width when in said first, trailer orientation via said first slot, said second slot, said third slot, and said fourth slot;
   a plurality of corner towers each comprising a removable roller assembly, wherein each one of said plurality of corner towers are configured to roll atop said stage floor until said pair of scissor assemblies are locked out via said pair of lock bars, after which said removable roller assemblies are configured to be removed to secure each respective one of said plurality of corner towers to a respective on of a plurality of tower couplers affixed to said stage floor; and
   wherein said pair of lock bars are configured to lock out said pair of scissor assemblies, such that said roof is secured above said stage floor via said pair of scissor assemblies and said plurality of corner towers, thereby forming said second, deployed stage orientation.

\* \* \* \* \*